United States Patent
Vajravel

(10) Patent No.: US 10,496,590 B2
(45) Date of Patent: Dec. 3, 2019

(54) ENABLING REDIRECTION POLICIES TO BE APPLIED BASED ON THE WINDOWS CLASS OF A USB DEVICE

(71) Applicant: Wyse Technology L.L.C.

(72) Inventor: Gokul Thiruchengode Vajravel, Bangalore (IN)

(73) Assignee: Wyse Technology L.L.C., Santa Clara, CA (US)

( * ) Notice: Subject to any disclaimer, the term of this patent is extended or adjusted under 35 U.S.C. 154(b) by 194 days.

(21) Appl. No.: 15/412,990

(22) Filed: Jan. 23, 2017

(65) Prior Publication Data

US 2018/0212817 A1    Jul. 26, 2018

(51) Int. Cl.
*H04L 12/24*  (2006.01)
*G06F 13/42*  (2006.01)
*H04L 29/08*  (2006.01)
*G06F 13/38*  (2006.01)

(52) U.S. Cl.
CPC ........ *G06F 13/4282* (2013.01); *G06F 13/385* (2013.01); *H04L 41/0893* (2013.01); *H04L 67/2814* (2013.01)

(58) Field of Classification Search
CPC .......................... H04L 41/046; H04L 41/0893
See application file for complete search history.

(56) References Cited

U.S. PATENT DOCUMENTS

| | | | | |
|---|---|---|---|---|
| 8,554,957 B1 * | 10/2013 | Wieland | ................ | G06F 9/4411 710/8 |
| 9,397,944 B1 * | 7/2016 | Hobbs | ..................... | H04L 47/00 |
| 2006/0047859 A1 * | 3/2006 | Cavalaris | .............. | G06F 9/4411 710/8 |
| 2006/0149858 A1 * | 7/2006 | Bhesania | ................ | H04L 63/08 710/5 |
| 2008/0140811 A1 * | 6/2008 | Welch | ................. | H04L 12/4625 709/219 |
| 2009/0094387 A1 * | 4/2009 | Bunger | ................... | G06F 3/038 710/11 |
| 2013/0254263 A1 * | 9/2013 | Kwon | ..................... | H04L 29/02 709/203 |
| 2015/0056978 A1 * | 2/2015 | Kobayashi | ........ | H04M 1/72533 455/420 |

* cited by examiner

*Primary Examiner* — Jason D Recek
(74) *Attorney, Agent, or Firm* — Kirton McConkie; Brian Tucker

(57) ABSTRACT

Redirection policies can be applied based on the Windows class of a USB device. When an agent on the server receives notification that a USB device has been connected to a client terminal that has a remote desktop connection with the server, the agent can employ the device descriptor contained in the notification to obtain the Windows class of the device. If the Windows class is obtained, and prior to causing the device to be enumerated on the server, the Windows class can be employed to apply one or more redirection policies. In this way, a redirected USB device can be managed at a much more granular level.

20 Claims, 15 Drawing Sheets

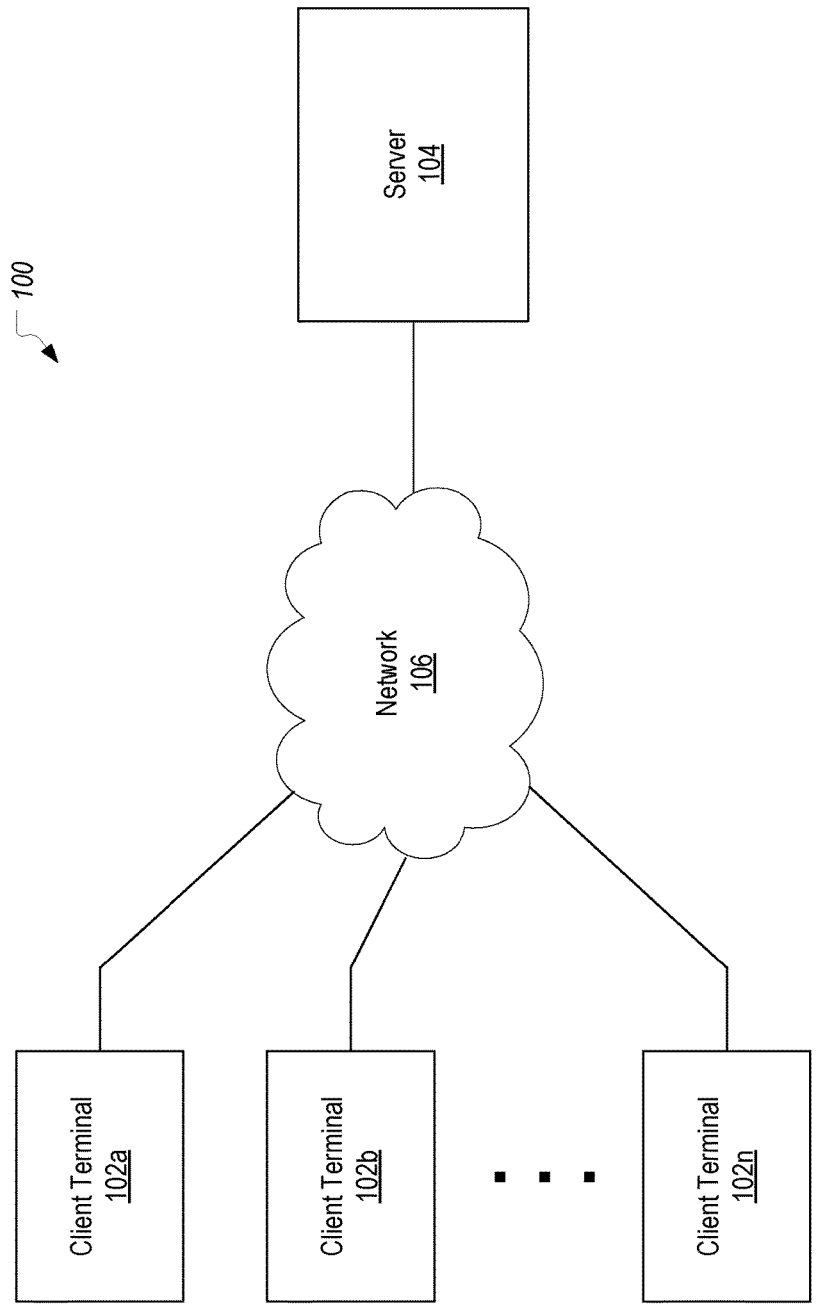

```
[Version]
Signature="$Windows NT$"
Class=Biometric

USB\VID_138A&PID_003F&REV_0104
USB\VID_138A&PID_003F

USB\Class_FF&SubClass_00&Prot_00
USB\Class_FF&SubClass_00
USB\Class_FF
```

ENABLING REDIRECTION POLICIES TO BE APPLIED BASED ON THE WINDOWS CLASS OF A USB DEVICE

CROSS-REFERENCE TO RELATED APPLICATIONS

N/A

BACKGROUND

The present invention is generally directed to USB device redirection in a virtual desktop infrastructure (VDI) environment. USB device redirection generally refers to making a USB device that is connected to a client accessible within a virtual desktop as if the USB device had been physically connected to the virtual desktop. In other words, when USB device redirection is implemented, a user can connect a USB device to his or her client terminal and the USB device will function as if it had been connected to the server.

FIGS. 1, 2A and 2B and the following description will provide a general overview of how USB device redirection can be implemented in accordance with some embodiments of the present invention. In FIG. 1, a computing system 100 is depicted as including a number of client terminals 102a-102n (referenced generally herein as client(s) 102) in communication with a server 104 via a network 106. Server 104 can be configured to support a remote session (e.g., a remote desktop session) wherein a user at a client 102 can remotely access applications and data at the server 104 from the client 102. Such a connection may be established using any of several well-known techniques such as the Remote Desktop Protocol (RDP) and the Citrix® Independent Computing Architecture (ICA).

Client terminal 102 may represent a computer, a mobile phone (e.g., smart phone), a laptop computer, a thin client terminal, a personal digital assistant (PDA), a portable computing terminal, or a suitable terminal or device with a processor. Server 104 may represent a computer, a laptop computer, a computing terminal, a virtual machine (e.g., VMware® Virtual Machine), a desktop session (e.g., Microsoft Terminal Server), a published application (e.g., Microsoft Terminal Server) or a suitable terminal with a processor.

Client 102 may initiate a remote session with server 104 by sending a request for remote access and credentials (e.g., login name and password) to server 104. If server 104 accepts the credentials from client 102, then server 104 may establish a remote session, which allows a user at client 102 to access applications and data at server 104. During the remote session, server 104 sends display data to client 102 over network 106, which may include display data of a desktop and/or one or more applications running on server 104. The desktop may include, for example, icons corresponding to different applications that can be launched on server 104. The display data allows client 102 to locally display the desktop and/or applications running on server 104.

During the remote session, client 102 may send user commands (e.g., inputted via a mouse or keyboard at client 102) to server 104 over network 106. Server 104 may process the user commands from client 102 similar to user commands received from an input device that is local to server 104. For example, if the user commands include mouse movements, then server 104 may move a pointer on the desktop running on server 104 accordingly. When the display data of the desktop and/or application changes in response to the user commands, server 104 sends the updated display data to client 102. Client 102 locally displays the updated display data so that the user at client 102 can view changes at server 104 in response to the user commands. Together, these aspects allow the user at client 102 to locally view and input commands to the desktop and/or application that is running remotely on server 104. From the perspective of the client side, the desktop running on server 104 may represent a virtual desktop environment.

FIG. 2A is a block diagram of a local device virtualization system 200 in accordance with embodiments of the present invention. System 200 may include client 102 in communication with server 104 over network 106 as illustrated in FIG. 1. Client 102 may include a proxy 210, a stub driver 220, and a bus driver 230. Client 102 can be connected to a device 240, as shown in FIG. 2A. Server 104 may include an agent 250 and a virtual bus driver 260.

In accordance with USB device redirection techniques, while device 240 is not locally or physically connected to server 104 and is remote to server 104, device 240 appears to server 104 as if it is locally connected to server 104, as discussed further below. Thus, device 240 appears to server 104 as a virtual device 290.

By way of illustration and not limitation, device 240 may be any type of USB device including a machine-readable storage medium (e.g., flash storage device), a printer, a scanner, a camera, a facsimile machine, a phone, an audio device (e.g., a headset), a video device (e.g., a camera), a peripheral device, or other suitable device that can be connected to client 102. Device 240 may be an external device (i.e., external to client 102) or an internal device (i.e., internal to client 102).

Bus driver 230 can be configured to allow the operating system and programs of client 102 to interact with device 240. In one aspect, when device 240 is connected to client 102 (e.g., plugged into a port of client 102), bus driver 230 may detect the presence of device 240 and read information regarding device 240 ("device information") from device 240. The device information may include features, characteristics and other information specific to device 240 such as a device descriptor (e.g., product ID, vendor ID and/or other information), a configuration descriptor, an interface descriptor, an endpoint descriptor and/or a string descriptor. Bus driver 230 may communicate with device 240 through a computer bus or other wired or wireless communications interface.

In accordance with USB device redirection techniques, device 240 may be accessed from server 104 as if the device were connected locally to server 240. Device 240 may be accessed from server 104 when client 102 is connected to server 104 through a user session running on server 104. For example, device 240 may be accessible from the desktop running on server 104 (i.e., virtual desktop environment). To enable this, bus driver 230 may be configured to load stub driver 220 as the default driver for device 240. Stub driver 220 may be configured to report the presence of device 240 to proxy 210 and to provide the device information (e.g., device descriptor) to proxy 210. Proxy 210 may be configured to report the presence of device 240, along with the device information, to agent 250 of server 104 over network 106. Thus, stub driver 220 redirects device 240 to server 104 via proxy 210.

Agent 250 may be configured to receive the report from proxy 210 that device 240 is connected to client 102 and the device information. Agent 250 may further be configured to associate with the report from proxy 210 one or more identifiers for client 102 and/or for a user session through which client 102 is connected to server 104, such as a session number or a session locally unique identifier (LUID). Agent 250 can provide notification of device 240, along with the device information, to virtual bus driver 260. Virtual bus driver 260 (which may be a TCX USB bus driver, or any other bus driver) may be configured to create and store in memory a record corresponding to device 240, the record including at least part of the device information and session identifiers received from agent 250. Virtual bus driver 260 may be configured to report to operating system 170 of server 104 that device 240 is connected and to provide the device information to the operating system. This allows the operating system of server 104 to recognize the presence of device 240 even though device 240 is connected to client 102.

The operating system of server 104 may use the device information to find and load one or more appropriate device drivers for device 240 at server 104. Each driver may have an associated device object (object(s) 281a, 281b, ..., 281n, referred to generally as device object(s) 281), as illustratively shown in FIG. 2A. A device object 281 is a software implementation of a real device 240 or a virtualized (or conceptual) device 290. Different device objects 281 layer over each other to provide the complete functionality. The different device objects 281 are associated with different device drivers (driver(s) 282a, 282b, ... 282n, referred to generally as device driver(s) 282). In an example, a device 240 such as a USB flash drive may have associated device objects including objects corresponding to a USB driver, a storage driver, a volume manager driver, and a file system driver for the device. The device objects 281 corresponding to a same device 240 form a layered device stack 280 for device 240. For example, for a USB device, a USB bus driver will create a device object 281a stating that a new device has been plugged in. Next, a plug-and-play (PNP) component of the operating system will search for and load the best driver for device 240, which will create another device object 281b that is layered over the previous device object 281a. The layering of device objects 281 will create device stack 280.

Device objects 281 may be stored in a memory of the server 104 associated with virtual bus driver 260. In particular, device objects 281 and resulting device stack 280 may be stored in random-access memory of server 104. Different devices 240/290 can have device stacks having different device objects and different numbers of device objects. The device stack may be ordered, such that lower level device objects (corresponding to lower level device drivers) have lower numbers than higher level device objects (corresponding to higher level device drivers). The device stack may be traversed downwards by traversing the stack from higher level objects to lower level objects. For example, in the case of an illustrative device stack 280 corresponding to a USB flash drive, the ordered device stack may be traversed downwards from a high-level file system driver device object, to a volume manager driver device object, to a storage driver device object, to a USB driver device object, and finally to a low-level virtual bus driver device object. Different device stacks 280 can be layered over each other to provide the functionality of the devices 240/290 inside devices, like USB Headsets, or USB pen drives. A USB pen drive, for example, can create a USB device stack first, over which it can create a storage device stack, where each of the device stacks have two or more device objects.

Once one or more device object(s) 281 are loaded by operating system 170 of server 104, each device object 281 can create a symbolic link (also referred to as a "device interface") to device object 281 and associated device driver 282. The symbolic link is used by applications running on server 104 to access device object 281 and device 240/290. The symbolic link can be created by a call to a function such as IoCreateSymbolicLink( ) including such arguments as a name for the symbolic link, and a name of device object 281 or associated device 240. In one example, for example, a symbolic link to a USB flash drive device 240 is created by a call from a device object 281 for device 240 to the function IoCreateSymbolicLink( ) including arguments "\\GLOBAL??\C:" (i.e., the name for the symbolic link) and "\Device\HarddiskVolume1" (i.e., a name of the device object).

The creation of a symbolic link results in an entry being created in an object manager namespace (OMN) of operating system 170. The OMN stores information on symbolic links created for and used by operating system 170, including symbolic links for devices 240, virtualized devices 290, and applications 270 running on server 104.

As a result of the symbolic link creation process, a symbolic link to device 240 is enumerated in the OMN of server 104. Once the presence of device 240 is reported to operating system 170 of server 104, device 240 may be accessible from a user session (and associated desktop) running on server 104 (i.e., virtual desktop environment). For example, device 240 may appear as an icon on the virtual desktop environment and/or may be accessed by applications running on server 104.

An application 270 running on server 104 may access device 240 by sending a transaction request including the symbolic link for device 240 to operating system 170. Operating system 170 may consult the Object Manager Namespace to retrieve an address or other identifier for the device itself 240 or for a device object 281 associated with device 240. Using the retrieved address or identifier, operating system 170 forwards the transaction request for device 240 either directly, through a device object 281 of device stack 280, and/or through virtual bus driver 260. Virtual bus driver 260 may direct the transaction request to agent 250, which sends the transaction request to proxy 210 over network 106. Proxy 210 receives the transaction request from agent 250, and directs the received transaction request to stub driver 220. Stub driver 220 then directs the transaction request to device 240 through bus driver 230.

Bus driver 230 receives the result of the transaction request from device 240 and sends the result of the transaction request to stub driver 220. Stub driver 220 directs the result of the transaction request to proxy 210, which sends the result of the transaction request to agent 250 over network 106. Agent 250 directs the result of the transaction request to virtual bus driver 260. Virtual bus driver 260 then directs the result of the transaction request to application 270 either directly or through a device object 281 of device stack 280.

Thus, virtual bus driver 260 may receive transaction requests for device 240 from application 270 and send results of the transaction requests back to application 270 (either directly or through a device object 281 of device stack 280). As such, application 270 may interact with virtual bus driver 260 in the same way as with a bus driver for a device that is connected locally to server 104. Virtual bus driver 260 may hide the fact that it sends transaction requests to agent 250 and receives the results of the transaction requests from agent 250 instead of a device that is connected locally to server 104. As a result, device 240 connected to client 102 may appear to application 270 as if the physical device 240 is connected locally to server 104.

The Object Manager Namespace (OMN) stores information on symbolic links created for use by operating system 170, including symbolic links for devices and for applications running on server 104. The Object Manager Namespace generally includes several different namespaces for storing symbolic link information for applications and devices. For example, the Object Manager Namespace can include namespaces such as: a "Global" namespace used to store symbolic link information for devices and applications that are shared by all user sessions running on server 104; various "Local" namespaces, each associated with a user session running on server 104, used to store information for applications used by (and restricted to) the associated user session; and a "Device" namespace used to store device object names of devices and virtual devices accessible by server 104. A "Global" namespace may be referred to as a global namespace. A "Local" namespace may be referred to as a local namespace. A "Device" namespace may be referred to as a device namespace.

As described herein, symbolic links can be stored in a global namespace or a local namespace. Symbolic links stored in a global namespace may be available to the entire system (i.e., to all user sessions running on server 104), while symbolic links stored in a local namespace may only be seen and accessed by the session for which they are created. For example, "\\GLOBAL??\c:" may be a symbolic link stored in a global namespace. "\Device\HarddiskVolume1" may be a device object name stored in a device namespace. A symbolic link "\\GLOBAL??\c:" may be pointing to a device object having a device object name of "\Device\HarddiskVolume1". Because "c:" is a symbolic link in the global namespace directory, such a symbolic link may be accessed by the entire system, including all the users logged in through their respective user sessions. A user application can open "\\GLOBAL??\c:" or just "c:" to access the actual device.

In certain operating systems, such as the Windows operating system, the creation of the symbolic link for a device 240 results in an entry being created in a Global namespace of the Object Manager Namespace. Because the symbolic link is created in the Global namespace, the symbolic link can be accessed from any user session running on server 104. As a result, the device 240 associated with the symbolic link can be accessed from any user session on server 104, and/or from any client terminal having an active user session on server 104.

FIG. 2B illustratively shows a block diagram of a computer system 100 providing local device virtualization. As previously described in relation to FIG. 1, system 100 includes client terminals 102a-102n communicating through network 106 with server 104. As described in relation to FIG. 2A above, each device 240a, 240b can be virtualized on server 104 to provide access to the device from a user session on server 104 through a corresponding virtual device 290a, 290b. For example, when device 240a is connected to client terminal 102a, drivers for device 240a may be loaded in operating system 170 of server 104, device 240a may be virtualized on server 104 as virtual device 290a, and a symbolic link to the device 240a may be created in the Object Manager Namespace of operating system 170. Once the symbolic link is created, a user of client terminal 102a may be able to access device 240a through a user session on server 104. Similarly, when device 240b is connected to client terminal 102b, a symbolic link to the device 240b may be created in the Object Manager Namespace of operating system 170 of server 104. Once the symbolic link is created, a user of client terminal 102b may be able to access device 240b through a user session on server 104.

The symbolic links to the devices 240a, 240b are created in a Global namespace of the Object Manager Namespace of operating system 170. As a result, the symbolic links and associated devices can be accessed from and used by any user session running on server 104. For example, as illustratively shown in FIG. 2B, a user of client terminal 102a having a user session on server 104 may access both device 240a as well as virtual device 240b' from the user session. Similarly, a user of client terminal 102b having a user session on server 104 may access both device 240b as well as virtual device 240a' from the user session. Finally, a user of client terminal 102c having a user session on server 104 may access both virtual device 240a' and 240b' from the user session.

Hence, the device virtualization described in relation to FIGS. 2A and 2B provides unrestricted access to devices 240 connected locally to client terminals 102 from any user session on server 104. As such, a redirected device becomes a local device to the server and can be accessed by all the users' sessions connected to that server. For example a printer or a mass storage device, when redirected by one user connected through a session on the server, will show up as a local device and all the users can read/write the mass storage device and print using the printer.

While the unrestricted access enables users of client terminals 102 to share access to and use of devices 240, the device virtualization does not permit a user to restrict access to a device 240. In this respect, the unrestricted device virtualization does not permit secure or private access to device 240. The device virtualization thus presents security and privacy concerns, as a device 240 may be accessed or used by any number of unauthorized users having user sessions on server 104. In order to address these security and privacy concerns, a device virtualization system may require that a device connected through a session only be accessible in that session.

FIG. 3 is a block diagram of a system 300 that can be employed to enforce session level restrictions to limit access to a redirected USB device. System 300 may include a client 102 in communication with a server 304 over network 106 such as is depicted in FIG. 1. Client 102, including proxy 210, stub driver 220, bus driver 230, and one or more optional device(s) 240, is substantially similar to the client 102 shown in and described in relation to FIG. 2A. Server 304 includes agent 250, virtual bus driver 260, device stack 280 including device objects 281a, 281b, . . . , 281n, device drivers 282a, 282b, . . . , 282n, operating system 170, application 270, and one or more optional virtualized device(s) 290, which function substantially similarly to the corresponding elements of server 104 of FIG. 2A.

Server 304 additionally includes a Device Access Restriction object (DAR object) 180 at the top of device stack 280. A Device Access Restriction driver (DAR driver) 182 creates and attaches DAR object 180 at the top of device stack 280. DAR driver 182 is registered with operating system 170 as the upper filter driver for all selected class(es) of devices for which access restriction is to be made. More particularly, DAR driver 182 associates itself with particular USB classes so that anytime a device in one of the particular classes is connected/redirected, operating system 170 will invoke DAR driver 182's AddDevice routine. When invoked, and possibly based on a determination that the device is in a class that should be session isolated, DAR driver 182 creates DAR object 180 and attaches the DAR object at the top of device stack 280.

Server 304 functions substantially similarly to server 104 in terms of loading drivers and device objects for device 240 on server 304. However, as discussed above, DAR driver 182 is registered as the upper filter driver for all the selected class(es) of devices for which access restriction is to be provided. For example, an image device class which includes webcams may be predetermined to be provided with access restriction. Such device classes may be predetermined by a user. When a device of the class, for which DAR driver 182 is registered, is plugged in, the DAR driver will be loaded and its add device routine may be called by operating system 170. For example, in cases where operating system 170 is a Windows system, a plug-and-play (PNP) component of the Windows Kernel will call an add device routine of DAR driver 182. Inside the add device routine, DAR driver 182 receives the physical device object of device stack 280 as an argument, which is used to verify that the device is a device redirected from client 102 using virtual bus driver 260. This verification is done by traversing device stack 280 downward until the bottom of the stack is reached or virtual bus driver 260 is found.

If virtual bus driver 260 is found in device stack 280, this signifies that the device is redirected from client 102 using the virtual bus driver. If the device is found to be redirected from client 102, DAR driver 182 creates DAR object 180 and attaches it (as the top object) onto device stack 280. However, if the bottom of device stack 280 is reached and virtual bus driver 260 is not found, this signifies that the device stack is not a device that is redirected from client 102, and thus no access restriction is to be provided. If the device is not found to be redirected, then DAR object 180 will not be attached on top of the device stack 280.

Since DAR object 180 is attached to the top of device stack 280, all requests for the redirected device are first received by DAR object 180. Thus, DAR object 180 can accept or reject the requests. For example, DAR object 180 can thus restrict a redirected device to be only accessible from the user session (e.g., a Microsoft windows terminal server session) it is redirected from. In some cases, this could be accomplished by blocking any I/O requests directed to device 240 that originate from any other user session. Alternatively, this could be accomplished by removing the symbolic link to device 240 from the global OMN and instead placing it in an local OMN specific to the user session which would not only block access to device 240 from other user sessions, but would prevent device 240 from being visible from the other user sessions.

The determination of whether to allow a particular USB device to be redirected and, if so, whether to apply session level restrictions is usually based on policy. For example, a policy may dictate that a particular user (or group) is allowed to redirect a printer but that any redirected printer should only be accessible from within the particular user's session. For the reasons presented above, these determinations must be made before a device is enumerated (i.e., before the process of detecting that a USB device has been connected, identifying the type of the connected USB device, and loading the appropriate drivers). As addressed above, in a redirection scenario, agent 250 will receive the device information from proxy 210 and provide this device information to virtual bus driver 260 which will then initiate the plug-and-play process. Agent 250 and/or virtual bus driver 260 may, based on policy, block the redirection of a USB device during this process (e.g., by failing to initiate the plug-and-play process if policy indicates that the particular class of USB devices should not be redirected). Similarly, DAR driver 182 must be registered for a particular USB class or USB classes in order to be invoked by the operating system during the plug-and-play process.

In short, the determination of whether to allow redirection and/or whether to require session isolation is based on the USB device descriptor. However, for many types of devices, the USB device descriptor is somewhat generic thereby preventing any type of granular control over which USB devices are allowed to be redirected and/or to which USB devices session level restrictions apply. As an example, scanners, biometric devices, and COM devices use a vendor specific class. Therefore, based only on the device descriptor, there is no way to determine whether a redirected device is a scanner, a biometric device, or a COM device. In short, for many types of USB devices, there is no unique USB device class that can be used to enable or disable redirection and/or session level restriction at the level of the device type. The only option would be to enable or disable these features for all USB devices that fall into a particular vendor specific class. For example, if it were desired to block biometric devices, this could only be accomplished by also blocking scanners and COM devices.

BRIEF SUMMARY

The present invention extends to methods, systems, and computer program products for enabling redirection policies to be applied based on the Windows class of a USB device. When an agent on the server receives notification that a USB device has been connected to a client terminal that has a remote desktop connection with the server, the agent can employ the device descriptor contained in the notification to obtain the Windows class of the device. If the Windows class is obtained, and prior to causing the device to be enumerated on the server, the Windows class can be employed to apply one or more redirection policies. In this way, a redirected USB device can be managed at a much more granular level.

In one embodiment, the present invention is implemented by a server in a virtual desktop infrastructure environment as a method for enabling redirection policies to be applied based on a Windows class of a USB device. A device descriptor of a USB device that has been connected to a client terminal that has established a remote session on the server can be received. An identifier of the USB device can be generated from the device descriptor. One or more INF files can be searched for the identifier. Upon determining that a particular INF file includes the identifier, a Windows class that is defined in the particular INF file can be obtained. The Windows class can then be employed to apply a policy governing redirection of the USB device.

In another embodiment, the present invention is implemented as computer storage media storing computer executable instructions which when executed implement an agent in a virtual desktop infrastructure environment. The agent can be configured to implement a method of enabling redirection policies to be applied based on a Windows class of a USB device by performing the following: receiving a device descriptor of a USB device that has been connected to a client terminal; searching one or more INF files for a Hardware ID generated from the device descriptor; upon identifying an INF file that includes the Hardware ID, obtaining a Windows class from the INF file; upon determining that no INF file includes the Hardware ID, searching the one or more INF files for a first Compatible ID generated from the device descriptor; and upon identifying an INF file that includes the first Compatible ID, obtaining a Windows class from the INF file.

In another embodiment, the present invention is implemented as a virtual desktop infrastructure environment that includes an agent that executes on a server, the agent being configured to communicate with a proxy executing on a client terminal, and a virtual bus driver that executes on the server, the virtual bus driver configured to implement USB device redirection. The agent is configured to identify a Windows class of a USB device that is connected to the client terminal using a device descriptor of the USB device that is received from the proxy and is also configured to manage the redirection of the USB device based on the Windows class. The agent identifies the Windows class by searching one or more INF files for one or more IDs generated from the device descriptor.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which:

FIG. 1 illustrates an example computing environment in which the present invention can be implemented;

FIG. 5 provides a simplified example of an INF file;

DETAILED DESCRIPTION

Figure 2A:
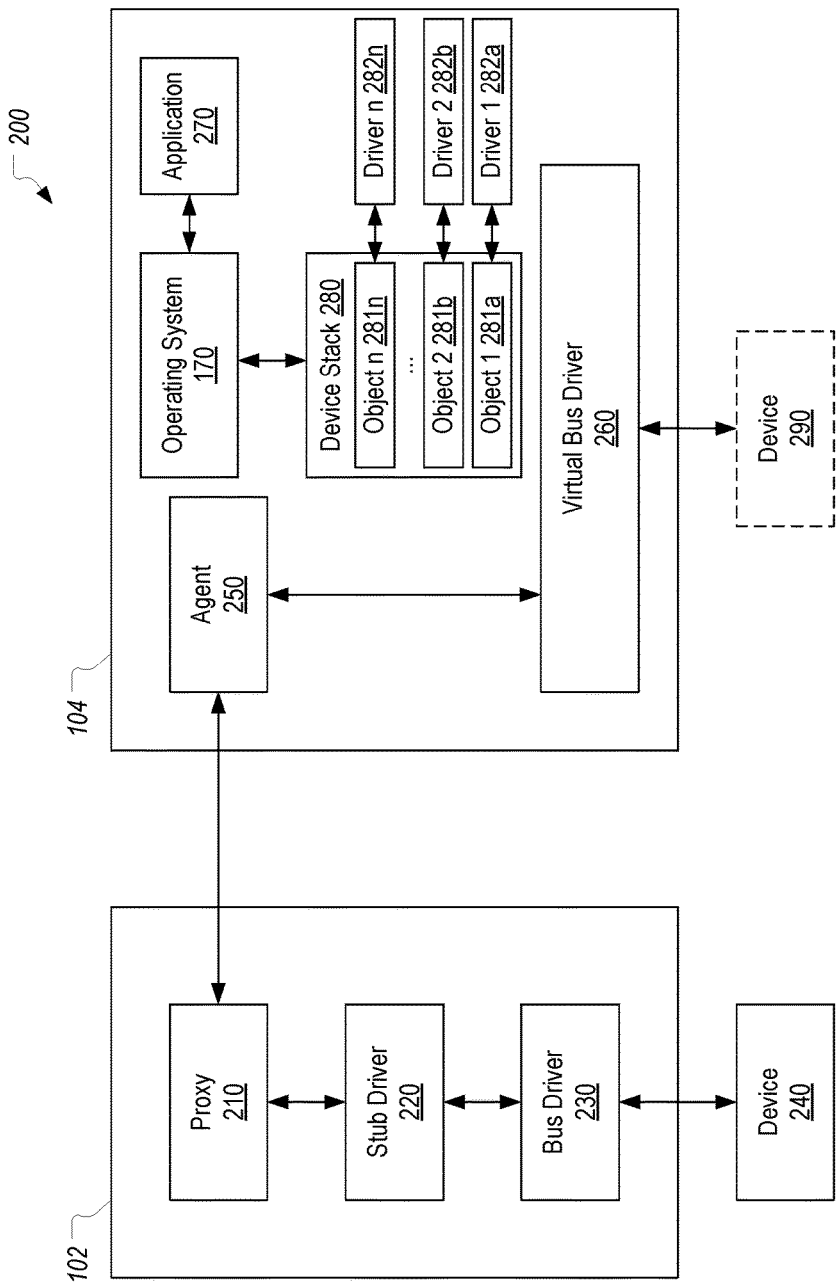
FIG. 2A illustrates how a USB device can be redirected from a client terminal to a server.
Figure 2B:
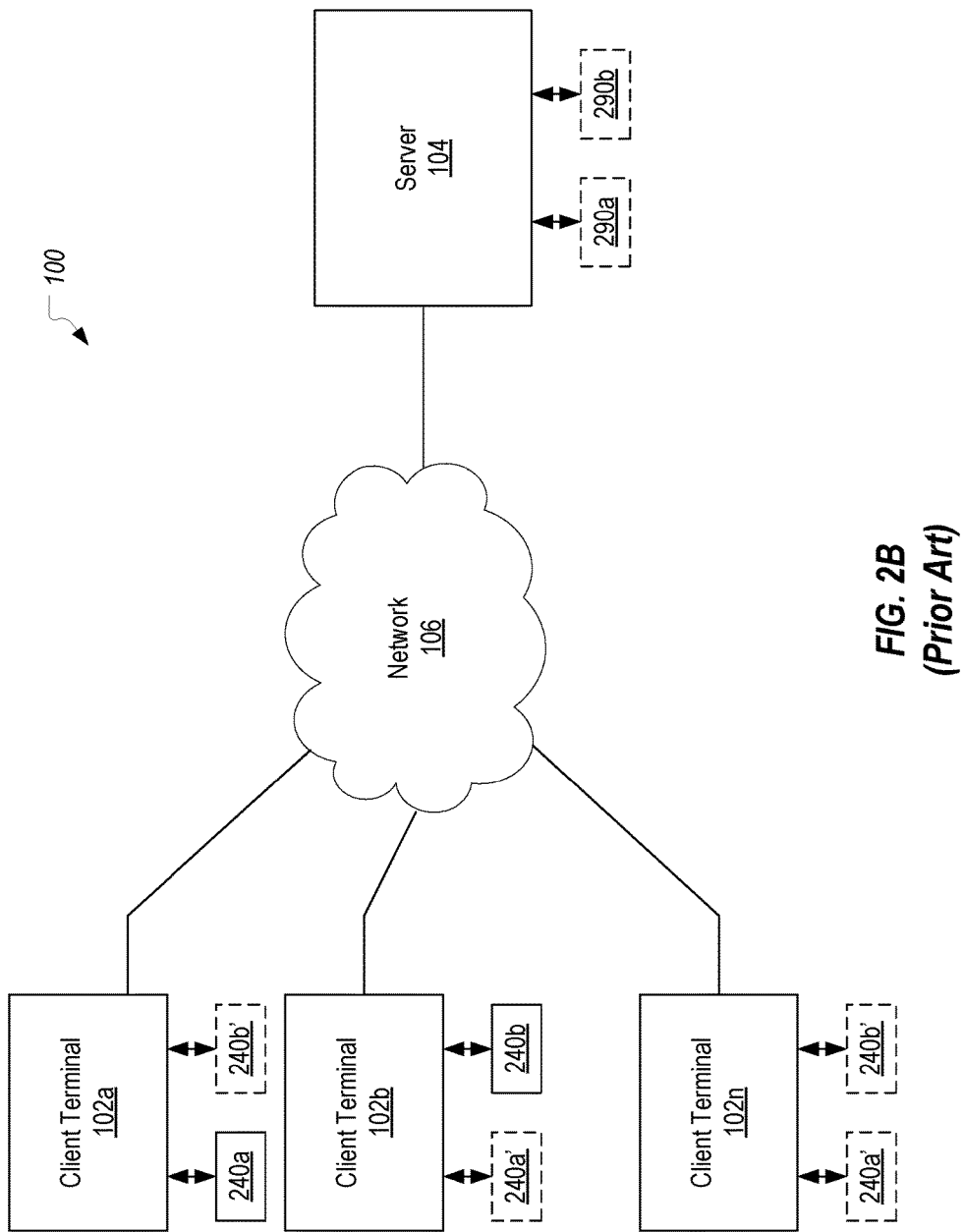
FIG. 2B illustrates how redirecting the USB device to the server can make the device accessible to any remote session established with the server.
Figure 3:
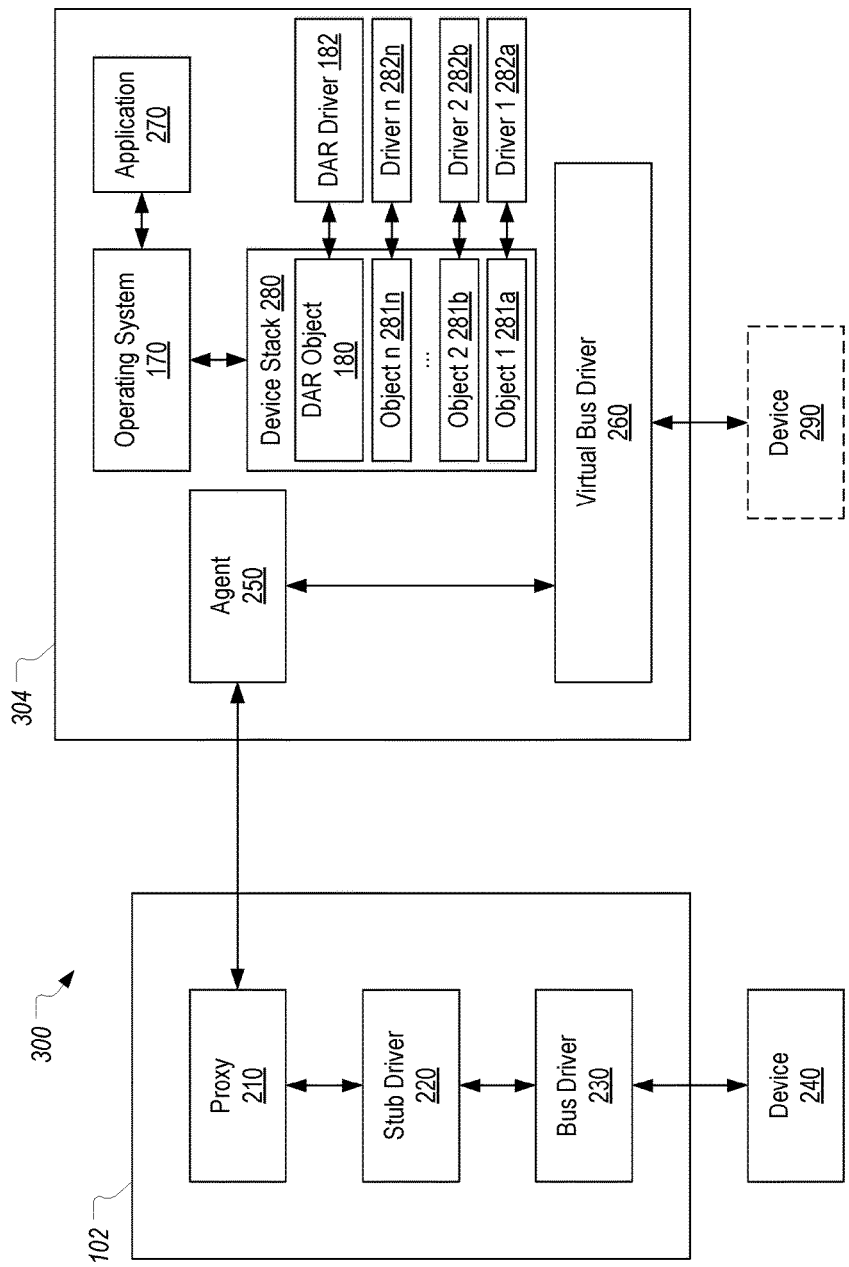
FIG. 3 illustrates how access to a redirected USB device can be restricted to the session over which the redirection occurs.

In this specification, the term "device descriptor" should be given its ordinary meaning, namely a data structure that describes a USB device. A device descriptor may include a number of different members such as a VendorID, a ProductID, a DeviceClass, a DeviceSubClass, and a DeviceProtocol as is known in the art. The term "redirection policy" or simply "policy" should be construed as any policy that applies to a redirected USB device. For example, a redirection policy could be in the form of an Active Directory group policy object. As such, a redirection policy may be applicable to a particular user/computer, to a particular group of users/computers, or to some other grouping of manageable objects/entities. The term "INF file" can typically refer to files having the extension .inf since this is the extension currently employed in the Windows operating system for driver information files. However, for purposes of the claims, an INF file should be construed as any type of file that is used by the operating system for the purpose of identifying which driver(s) to load when a device is connected. Similarly, the INF folder should be construed as any folder or folders in which INF files are stored.

In accordance with embodiments of the present invention, in a USB device redirection scenario, the device descriptor of a USB device can be employed to determine the Windows class (or more specifically, the Windows device setup class) prior to enumerating the device on the server. By determining the Windows class prior to enumeration, redirection policies can be applied at the Windows class level rather than at the USB device descriptor level (e.g., based on the DeviceClass).

FIGS. 4A-4F illustrate an example of how the present invention can be implemented in a system 400 that includes a server 404 and at least one client terminal 102 that establishes a remote desktop connection with server 404. Although not shown, system 400 can include the same components as systems 200 and 300 described above. In fact, the present invention can be implemented by agent 250 in a manner that is transparent to client terminal 102 and operating system 170. In other words, from the perspective of client terminal 102 and operating system 170 (as well as other components on server 404), device redirection can be carried out in much the same manner as described in the background.

Figure 4A:
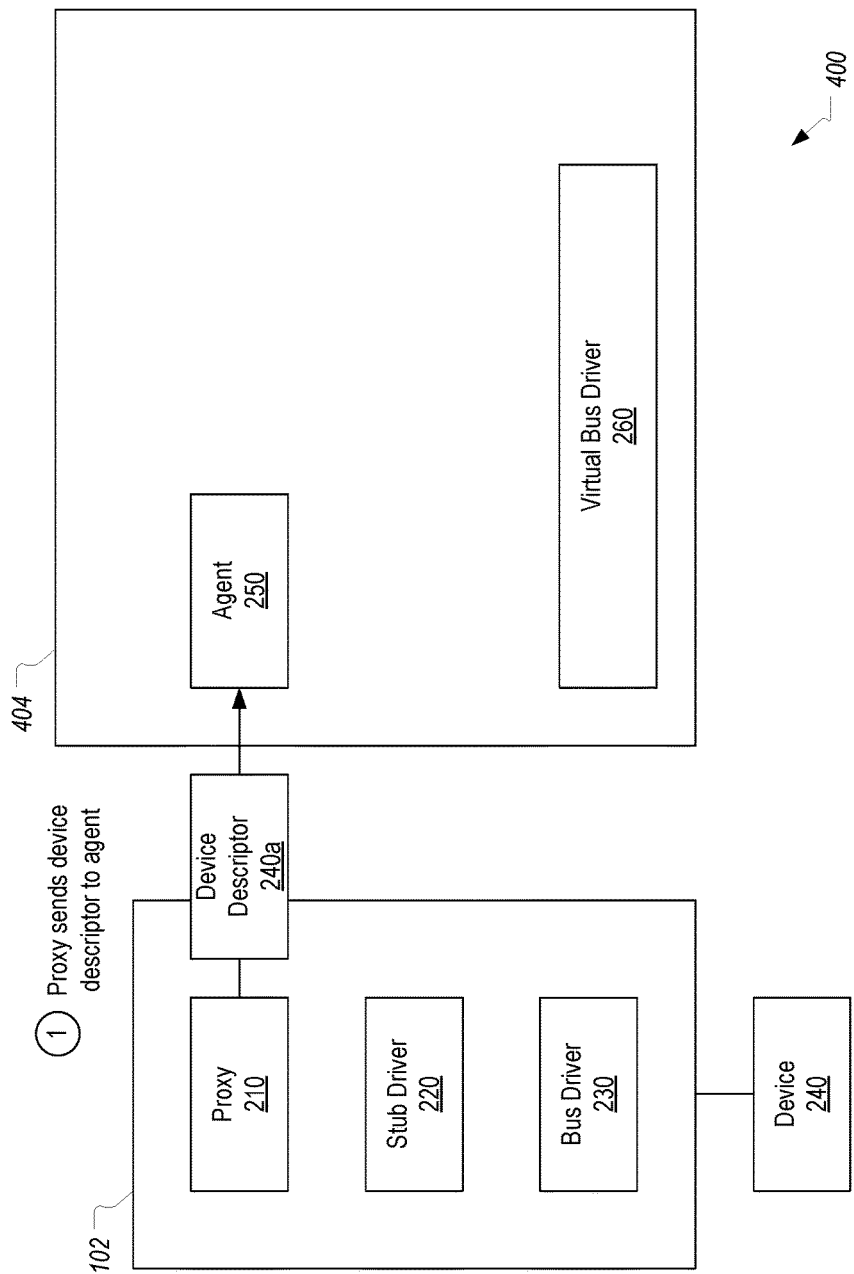
FIGS. 4A-4F illustrate an example of how an agent can use the device descriptor to obtain the Windows class of a USB device prior to enumerating the USB device on the server.
Figure 4B:
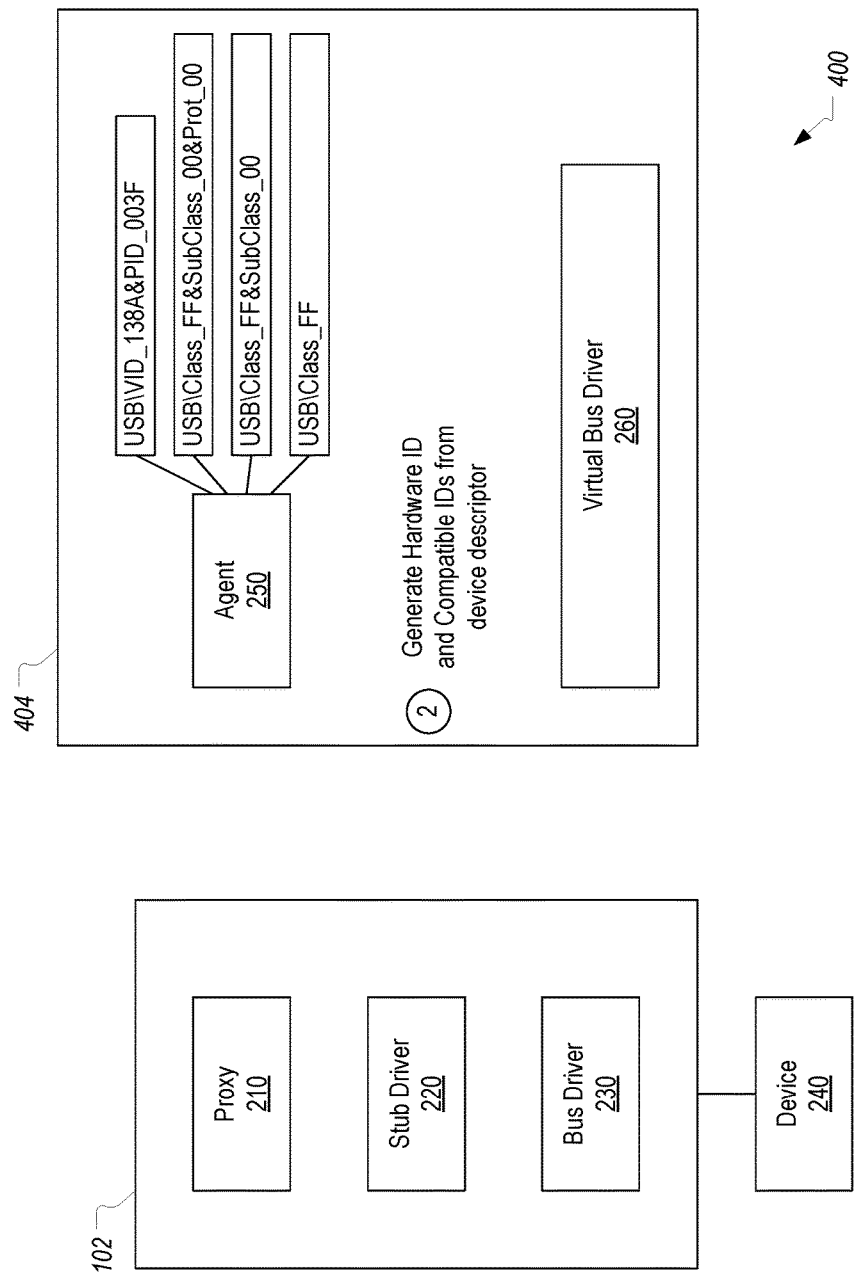

In FIG. 4A, it is assumed that USB device 240 has been physically connected to client terminal 102. As a result, stub driver 220 can be loaded (if not previously loaded) and can obtain the device descriptor 240a from device 240. Assuming client terminal 102 is configured to redirect this type of device, stub driver 220 can provide device descriptor 240a to proxy 210 which will forward device descriptor 240a to agent 250 (e.g., via a remote desktop connection) in step 1.

Accordingly, step 1 can be performed in a standard manner such as was described in the background. However, unlike in prior techniques in which agent 250 would send device descriptor 240a to virtual bus driver 260 to initiate the plug-and-play process on server 404, in step 2, agent 250 can instead examine the contents of device descriptor 240a in order to generate the Hardware ID and/or one or more Compatible IDs for device 240. For example, in FIG. 4B, agent 250 is shown as having generated a Hardware ID of USB\VID_138A&PID_003F and three Compatible IDs of USB\Class_FF&SubClass_00&Prot_00, USB\Class_FF&SubClass_00, and USB\Class_FF which happen to be the IDs of a Synaptics fingerprint scanner. Therefore, this example can represent a scenario when a Synaptics fingerprint scanner is connected to (or available on) client terminal 102.

Figure 4C:
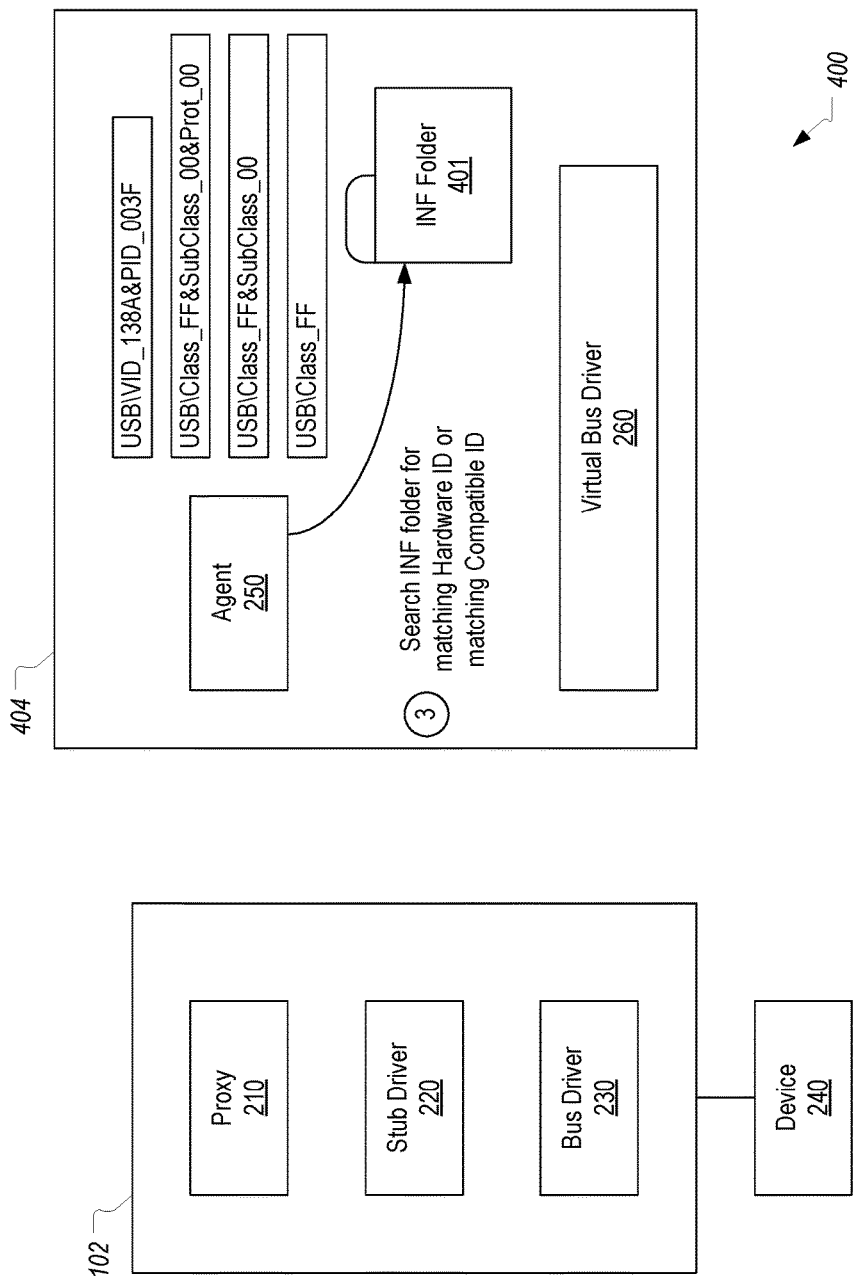

Turning to FIG. 4C, with the IDs generated and in step 3, agent 250 can query the Windows INF folder 401 (which is where information (INF) files are stored which define the information necessary for operating system 170 to locate and load the proper driver(s) when a device is connected) using the IDs. More particularly, agent 250 can search through INF files stored in the INF folder 401 in an attempt to locate an INF file that includes the generated Hardware ID and/or one of the generated Compatible IDs.

Each INF file defines, among many other things, a Windows class and the identifier (e.g., Hardware ID and/or Compatible ID(s)) of any device associated with the INF file. FIG. 5 provides a simplified example of an INF file 500 that may exist in INF folder 401 (assuming that the corresponding driver(s) had been previously installed on sever 404). As shown, INF file 500 defines the Windows class "Biometric" as well as a number of IDs that fall under this class. Therefore, in this case, INF file 500 is assumed to pertain to a Synaptics fingerprint scanner.

Figure 4D:
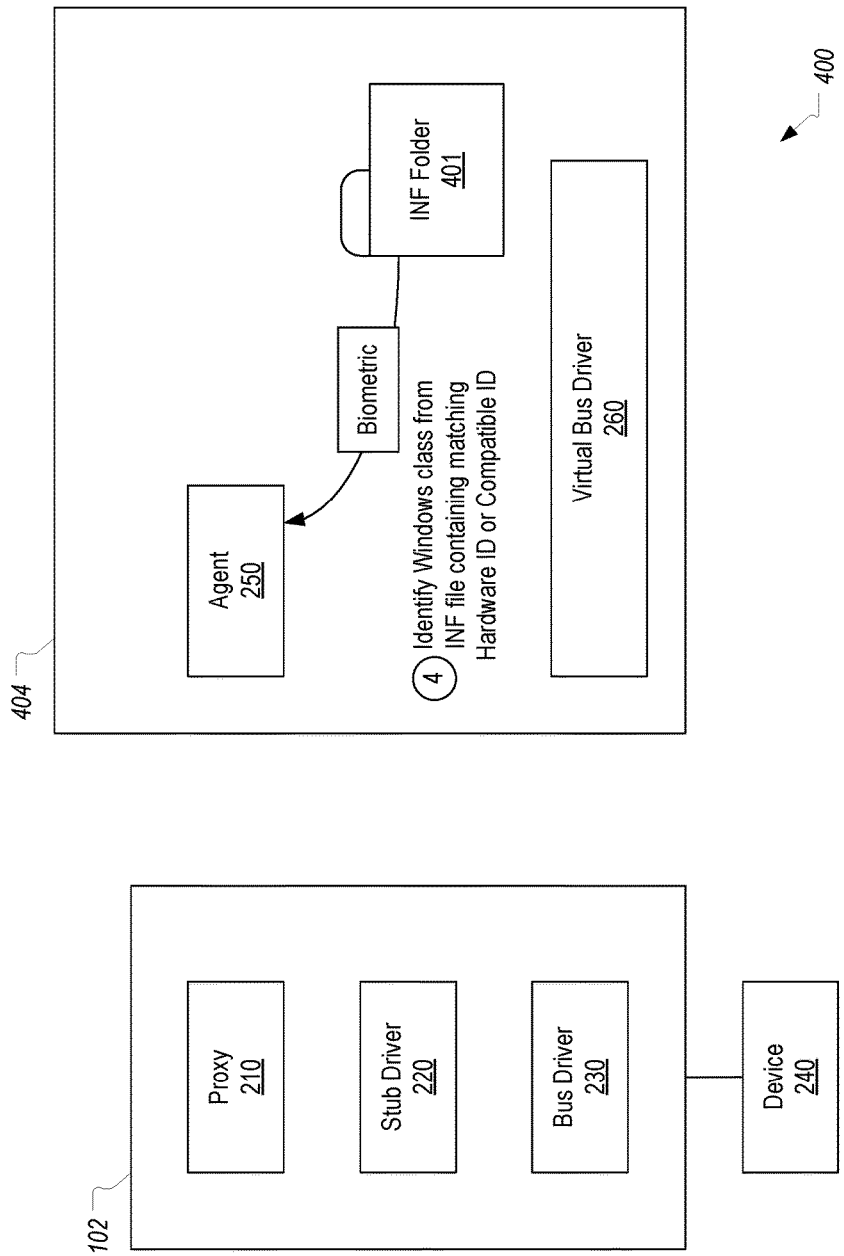

In the present example, in response to searching through the INF files in INF folder 401 for the generated Hardware ID and/or Compatible ID(s) for device 240, agent 250 will determine that INF file 500 includes a match. Upon detecting a match, agent 250 can obtain the Windows class that is defined in the matching INF file. Therefore, in step 4 as shown in FIG. 4D, agent 250 obtains the Windows class "Biometric" from INF file 500.

Figure 4E:
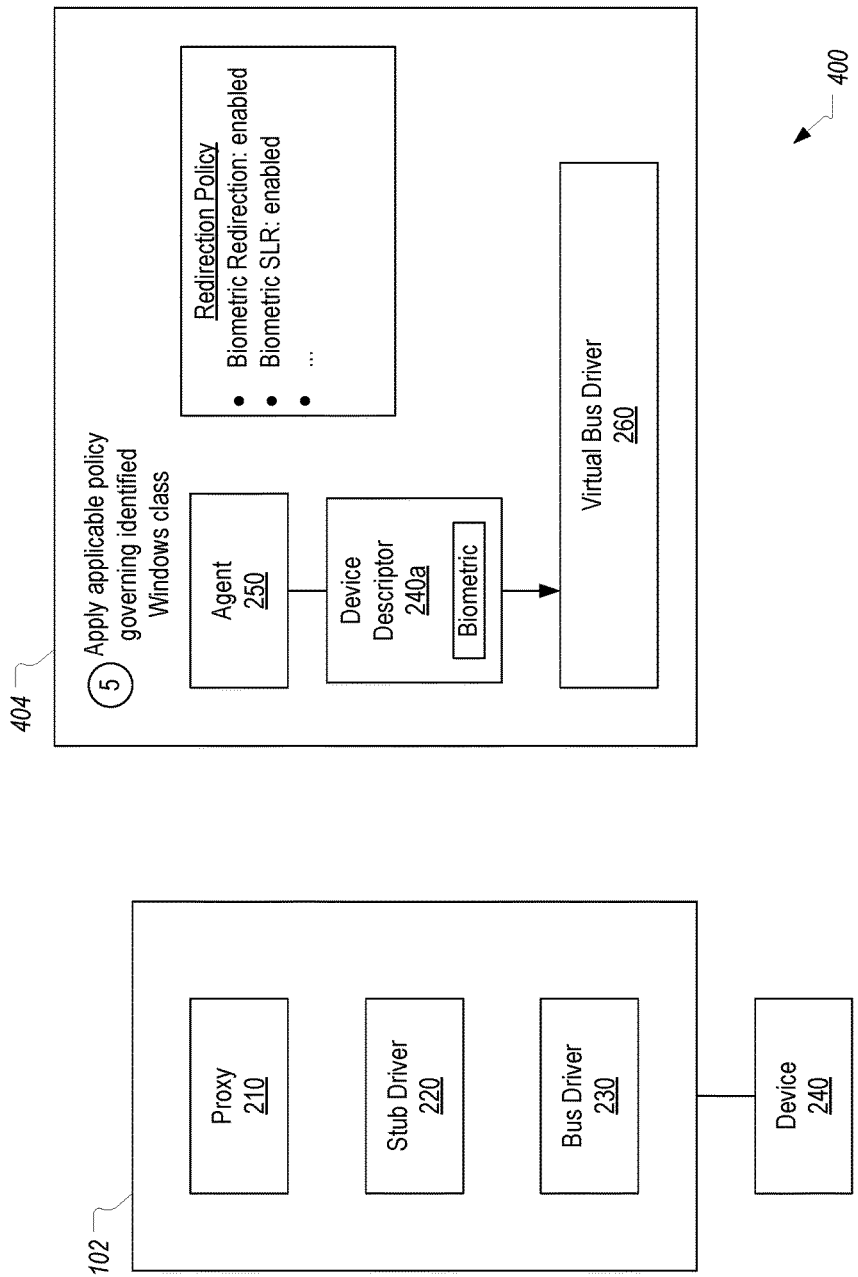

In step 5 as shown in FIG. 4E, agent 250 can employ the obtained Windows class to identify an applicable policy and apply the policy to the redirection of USB device 240. For example, in FIG. 4E, it is assumed that a policy that is applicable to the remote session (e.g., that pertains to the user of client terminal 102, to a group or organization to which the user belongs, or to client terminal 102) exists and indicates that redirection and session level restrictions are enabled for USB devices in the Biometric Windows class. Based on the fact that the policy enables redirection of Biometric devices, agent 250 can forward device descriptor 240*a* to virtual bus driver 260 (as part of a device addition notification) to initiate the plug-and-play process. Also, agent 250 can include an identification of the Windows class with device descriptor 240*a* thereby allowing virtual bus driver 260 to apply any additional policy settings such as, for example, causing a DAR object to be loaded based on the fact that the policy requires a Biometric device to be session isolated. Additionally, virtual bus driver 260 could employ the Windows class to determine which properties of the device to set before the device has started. Again, setting device properties based on the Windows class rather than on the content of the device descriptor enables a much more granular level of management for many USB devices.

Of course, if an applicable policy instead indicated that redirection of biometric devices should not be enabled, agent 250 could have failed to forward device descriptor 240*a* to virtual bus driver 260 thereby preventing device 240 from being enumerated on server 404. In such a scenario, agent 250 may also notify proxy 210 that device 240 cannot be redirected so that proxy 210 can cause device 240 to be available locally on client terminal 102. Similarly, if an applicable policy allows redirection of biometric devices but does not require session level restrictions, virtual bus driver 260 (or possibly agent 250) could forego causing a DAR object to be loaded on the USB device stack for device 240. In short, using the techniques of the present invention, any administrator-defined policy can be applied and any property of a USB device can be set based on the Windows class.

Figure 4F:
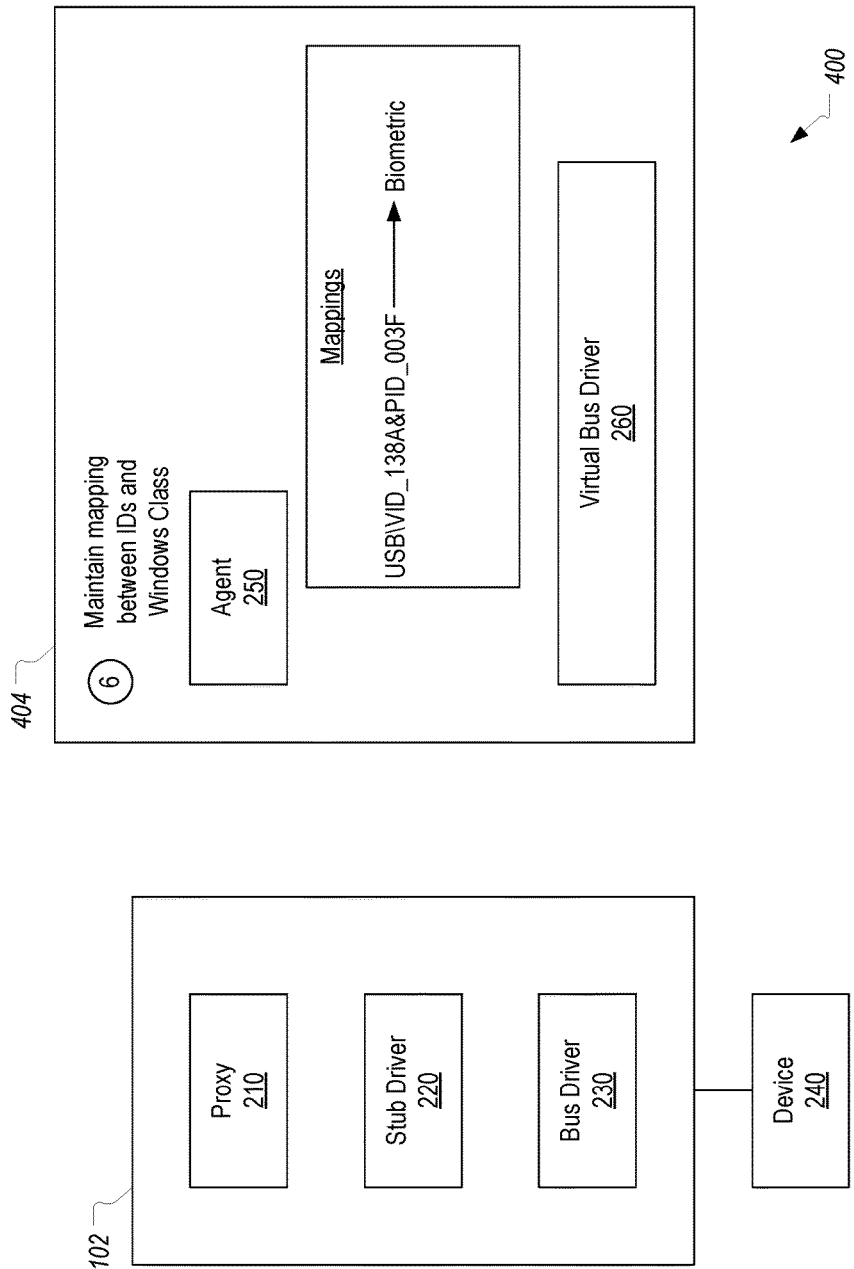

Finally, in some embodiments as indicated in step 6 in FIG. 4F, agent 250 may maintain mappings between IDs and their corresponding Windows class so that the Windows class can be subsequently determined when the device is again connected without needing to query the INF files. For example, in FIG. 4F, agent 250 is shown as having added a mapping between Hardware ID "USB\ID_138A&PID_003F" and the Windows class "Biometric." This mapping is based on the assumption that agent 250 found the Hardware ID in an INF file in step 4. Of course, if agent 250 had instead found one of the Compatible IDs rather than the Hardware ID, a mapping could have instead been created between the matched Compatible ID and Biometric. Also, if agent 250 happened to match more than one ID, it could add a mapping for each matched ID.

In summary, when agent 250 receives a device descriptor, it can generate the Hardware ID and/or Compatible IDs and use these IDs to locate an INF file containing the ID(s). If a matching INF file is found, the Windows class defined in the matching INF file can be used to determine which redirection policy (if any) should be applied to the device. In this way, policy can be applied on the Windows class basis thereby enabling individual management of a number of USB devices that could not be managed individually previously (e.g., those falling under the USB class FF). For example, using prior art techniques, if it was desired to disable redirection of a scanner (which is in USB class FF), redirection of all USB class FF devices would need to be disabled. In contrast, with the present invention, redirection of a scanner can be disabled based on the Windows class so that other non-scanner USB class FF devices can still be redirected.

Figure 6:
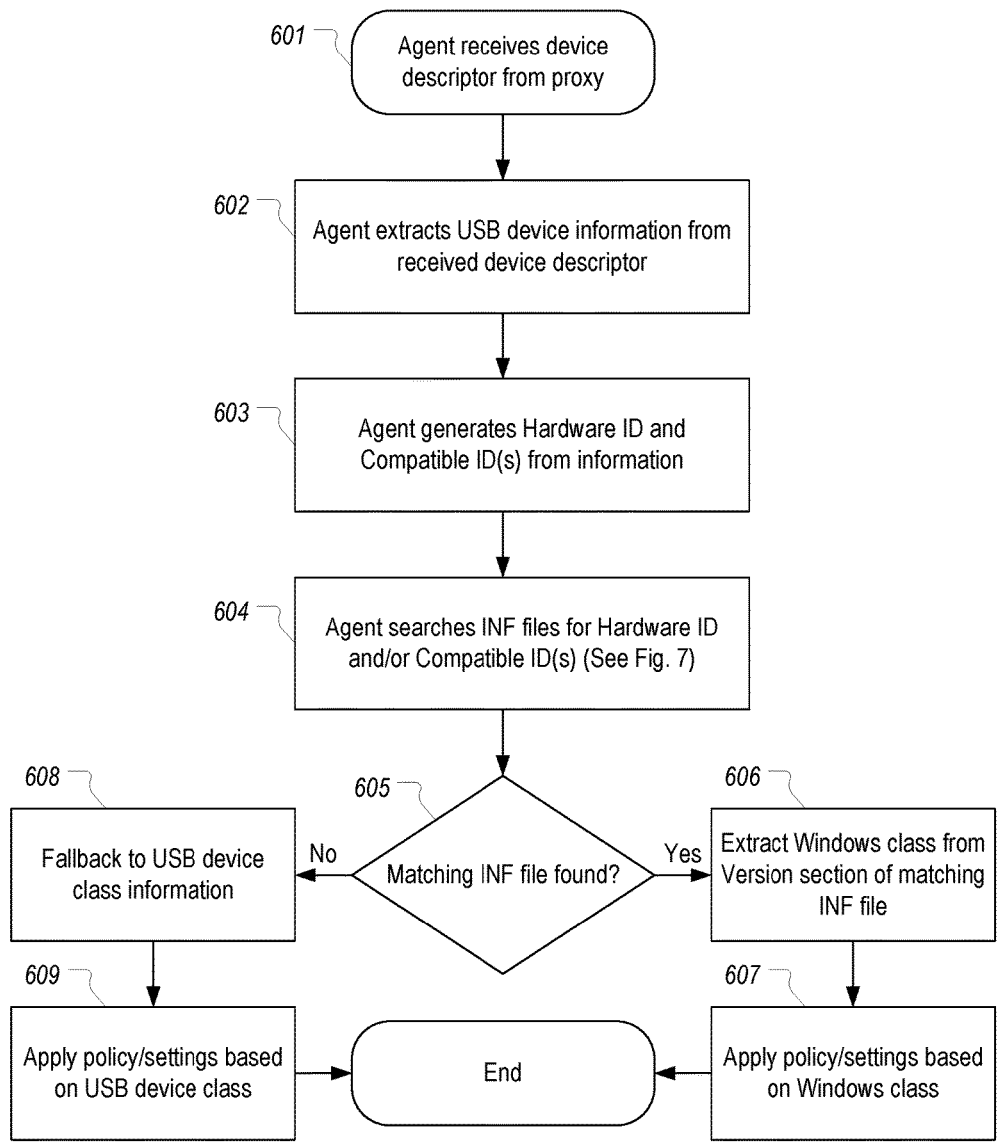
FIGS. 6-8 provide flowcharts of various processes that can be performed to obtain the Windows class using identifiers generated from the device descriptor.

FIG. 6 provides a flowchart depicting the above-described process. In a first step 601, agent 250 receives a device descriptor from proxy 210. In step 602, agent 250 extracts the USB device information (e.g., the Vendor ID, Product ID, Class, SubClass, and Protocol) from the device descriptor. Next, in step 603, agent 250 can generate the Hardware ID and Compatible IDs from the extracted device information. For reasons that will become apparent below, agent 250 could generate these IDs in a hierarchical manner. However, agent 250 may also generate each of the IDs prior to searching for any matching INF files.

In step 604, agent 250 can search the INF files to determine if the generated IDs appear in any of the INF files. A more detailed description of how step 604 can be implemented in some embodiments is provided in FIG. 7. In step 605, a determination is made as to whether an INF file includes one of the IDs. If so, the Windows class defined in the Version section of the matching INF file is extracted in step 606 and used in step 607 to determine which policy and settings to apply for the redirection of the USB device. In contrast, if no matching INF file is found, agent 250 can fallback to the USB device class information in step 608, and use the device class information in step 609 to determine which policy and settings to apply for the redirection of the USB device. Accordingly, as long as an ID can be found in an INF file, agent 250 will be able to determine the Windows class and use it to perform a more granular level of management on a redirected device.

Figure 7:
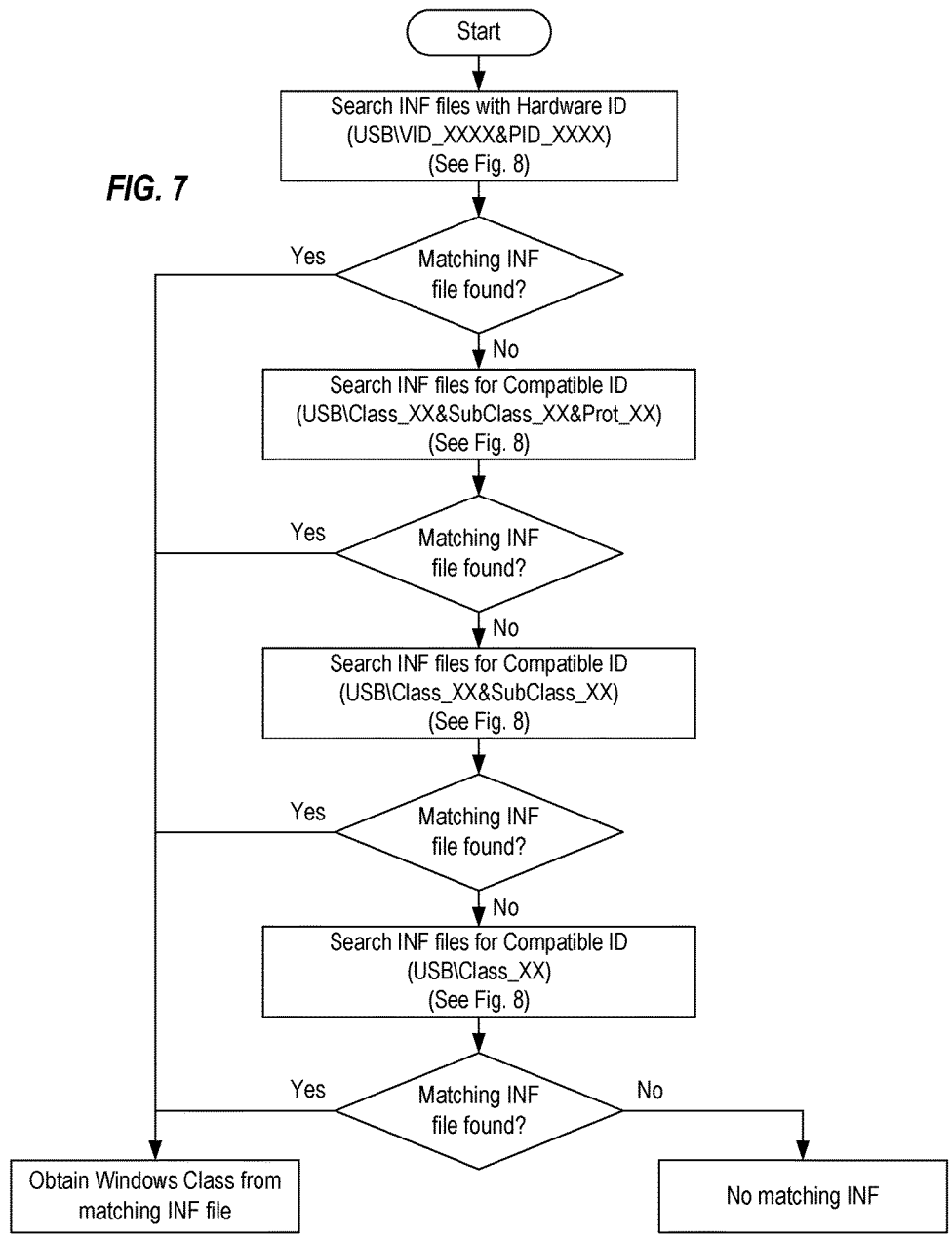

FIG. 7 illustrates how agent 250 can search for IDs in a hierarchical manner. FIG. 7 represents steps that can be included within step 604 in FIG. 6. First, agent 250 can attempt to locate the Hardware ID in an INF file, and if found, can return the Windows class defined in the INF file. However, if the Hardware ID is not found in any INF file, agent 250 can then search for the Compatible ID that includes the Class, SubClass, and Protocol. Again, if this Compatible ID is found, the Windows class defined in the INF file containing the Compatible ID can be returned. If the Compatible ID containing the Class, SubClass, and Protocol is not found, agent 250 can then search for the Compatible ID consisting of only the Class and SubClass. If not found, agent 250 can ultimately search for the Compatible ID consisting of only the Class. If the Hardware ID is not found and none of the Compatible IDs are found, agent 250 can determine that the Windows class cannot be determined and can resort to using the USB device class for policy and setting purposes as indicated above.

Figure 8:
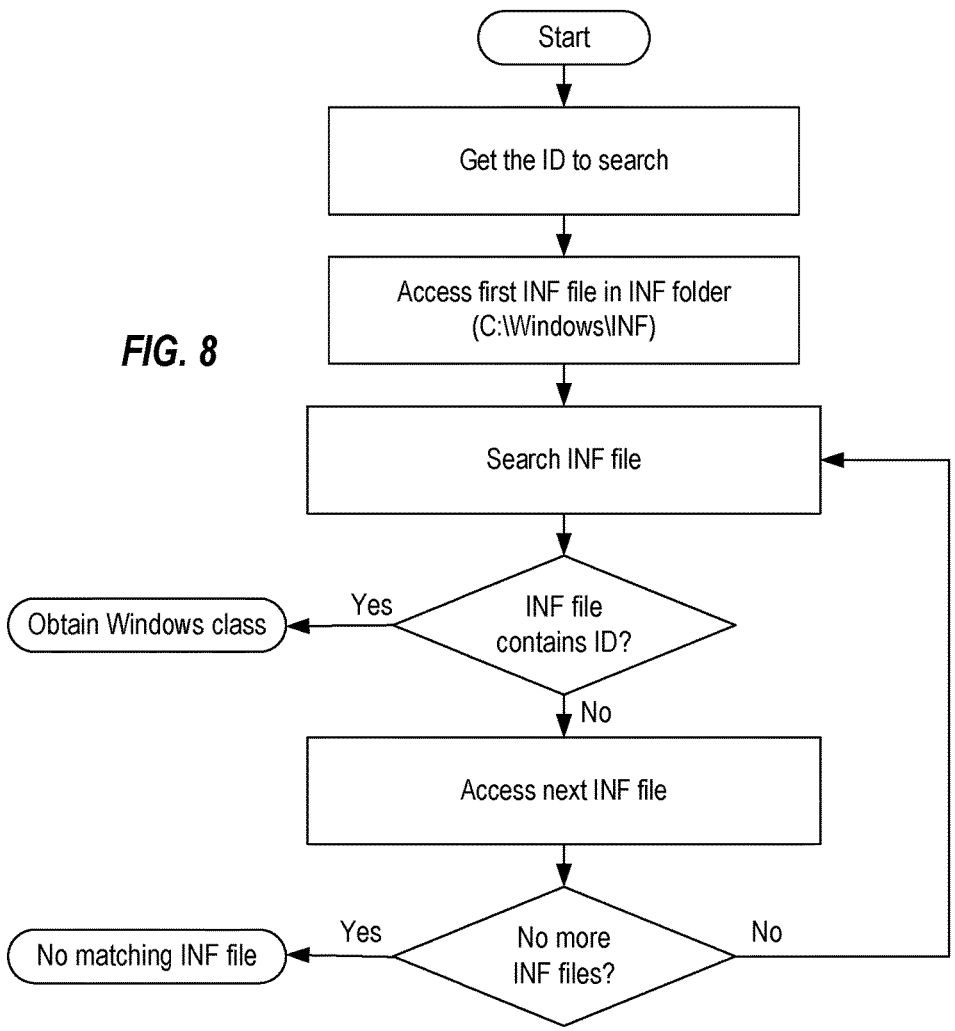

FIG. 8 provides more detail on how each of the searching steps of FIG. 7 can be performed. As shown, for each ID, agent 250 can step through each INF file in the INF folder (and possibly in other locations) to determine whether the INF file includes the ID. If the ID is not found in any INF file, the process can be repeated for the next ID in the hierarchy. If at any point, the ID being searched is found in an INF file, the Windows class defined in that INF file can be returned. On the other hand, if each INF file has been searched for each ID and no match has been found, agent 250 can resort to using the USB device class (or other device information).

Figure 9:
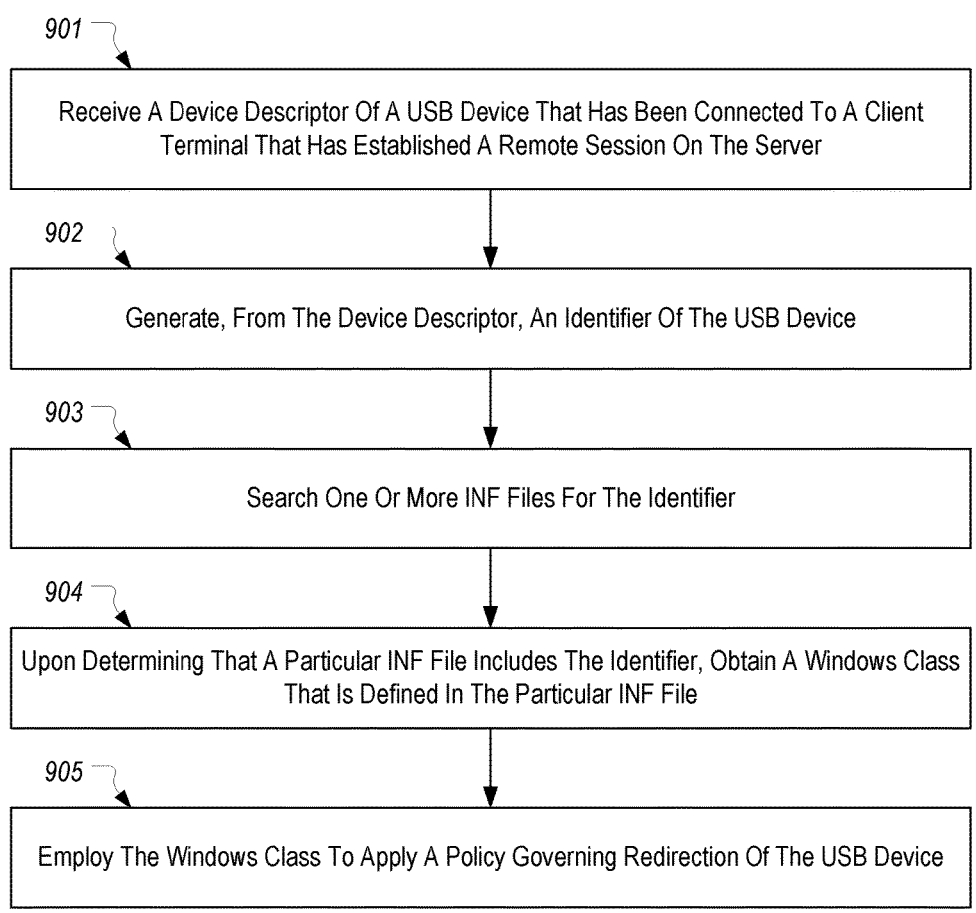
FIG. 9 provides a flowchart of an example method for enabling redirection policies to be applied based on a Windows class of a USB device.

FIG. 9 provides a flowchart of an example method 900 for enabling redirection policies to be applied based on a Windows class of a USB device. Method 900 can be implemented in a virtual desktop infrastructure environment by agent 250 alone or in combination with virtual bus driver 260.

Method 900 includes an act 901 of receiving a device descriptor of a USB device that has been connected to a client terminal that has established a remote session on the server. For example, agent 250 can receive device descriptor 240a from client terminal 102 when device 240 is connected to client terminal 102.

Method 900 includes an act 902 of generating, from the device descriptor, an identifier of the USB device. For example, agent 250 can generate the Hardware ID and/or one or more of the Compatible IDs using the information contained in device descriptor 240a.

Method 900 includes an act 903 of searching one or more INF files for the identifier. For example, agent 250 can search the INF files contained in INF folder 401.

Method 900 includes an act 904 of, upon determining that a particular INF file includes the identifier, obtaining a Windows class that is defined in the particular INF file. For example, agent 250 can identify the Windows class in the Version section of an INF file that includes the identifier.

Method 900 includes an act 905 of employing the Windows class to apply a policy governing redirection of the USB device. For example, agent 250 and/or virtual bus driver 260 can prevent redirection, require session level restrictions, or set some other property based on the fact that device 240 has been identified as falling under the Biometric Windows class.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, performed by an agent that executes on a server in a virtual desktop infrastructure environment, for enabling redirection policies to be applied based on a system-defined device setup class of a USB device, the method comprising:
receiving, by the agent, a device descriptor of a USB device that has been connected to a client terminal that has established a remote session on the server;
generating, by the agent and from the device descriptor, an identifier of the USB device;
searching, by the agent, one or more INF files for the identifier;
upon determining that a particular INF file includes the identifier, obtaining, by the agent, a system-defined device setup class that is defined in the particular INF file;
employing, by the agent, the system-defined device setup class to identify a policy governing redirection of USB devices matching the system-defined device setup class; and
applying, by the agent, the policy to selectively handle the received device descriptor.

2. The method of claim 1, wherein the identifier is the Hardware ID.

3. The method of claim 1, wherein the identifier is a Compatible ID.

4. The method of claim 3, wherein the Compatible ID includes a class, a subclass, and a protocol.

5. The method of claim 3, wherein the Compatible ID includes only a class and a subclass.

6. The method of claim 3, wherein the Compatible ID includes only a class.

7. The method of claim 1, wherein searching one or more INF files for the identifier comprises searching all INF files in the Windows INF folder.

8. The method of claim 1, wherein applying the policy to selectively handle the received device descriptor comprises:
determining that the policy indicates that redirection of USB devices matching the system-defined device setup class is enabled; and based on the determination, forwarding the device descriptor of the USB device to a virtual bus driver to thereby cause the USB device to be enumerated on the server.

9. The method of claim 8, wherein applying the policy to selectively handle the received device descriptor further comprises;
determining that the policy indicates that session level restrictions must be applied to USB devices matching the system-defined device setup class, and
based on the determination, including the system-defined device setup class with the device descriptor of the USB device that is forwarded to the virtual bus driver.

10. The method of claim 1, wherein applying the policy to selectively handle the received device descriptor comprises:
determining that the policy indicates that redirection of USB devices matching the system-defined device setup class is not enabled; and
based on the determination, failing to forward the device descriptor of the USB device to a virtual bus driver to thereby prevent the USB device from being enumerated on the server.

11. The method of claim 1, wherein generating, from the device descriptor, an identifier of the USB device comprises generating multiple identifiers; and wherein searching one or more INF files for the identifier comprises searching the one or more INF files for each of the multiple identifiers.

12. The method of claim 11, wherein the one or more INF files are iteratively searched for each of the multiple identifiers until one of the identifiers is found in an INF file.

13. The method of claim 12, wherein the multiple identifiers include a Hardware ID and one or more Compatible IDs and wherein the one or more INF files are searched for the Hardware ID before searching the one or more INF files for the one or more Compatible IDs.

14. The method of claim 1, further comprising:
storing a mapping between the identifier and the system-defined device setup class.

15. The method of claim 14, further comprising:
subsequently receiving the device descriptor;
generating, from the subsequently received device descriptor, the identifier of the USB device;
obtaining, from the mapping, the system-defined device setup class;
employing, by the agent, the system-defined device setup class obtained from the mapping to identify the policy; and
applying, by the agent, the policy to selectively handle the subsequently received device descriptor.

16. One or more computer storage media storing computer executable instructions which when executed implement an agent in a virtual desktop infrastructure environment, the agent being configured to implement a method of enabling redirection policies to be applied based on a system-defined device setup class of a USB device, the method comprising:
receiving a device descriptor of a USB device that has been connected to a client terminal;
searching one or more INF files for a Hardware ID generated from the device descriptor;
upon identifying an INF file that includes the Hardware ID, obtaining a system-defined device setup class from the INF file;
upon determining that no INF file includes the Hardware ID, searching the one or more INF files for a first Compatible ID generated from the device descriptor; and
upon identifying an INF file that includes the first Compatible ID, obtaining a system-defined device setup class from the INF file;
employing, by the agent, the system-defined device setup class to identify a policy governing redirection of USB devices matching the system-defined device setup class; and
applying, by the agent, the policy to selectively handle the received device descriptor.

17. The computer storage media of claim 16, wherein the method further comprises:
upon determining that no INF file includes the first Compatible ID, searching the one or more INF files for a second Compatible ID generated from the device descriptor, the second Compatible ID included a subset of information that was included in the first Compatible ID.

18. The computer storage media of claim 16, wherein applying the policy to selectively handle the received device descriptor comprises:
determining that the policy indicates that redirection of USB devices matching the system-defined device setup class is enabled; and
based on the determination, forwarding the device descriptor of the USB device to a virtual bus driver to thereby cause the USB device to be enumerated on the server.

19. The computer storage media of claim 18, wherein applying the policy to selectively handle the received device descriptor further comprises:
determining that the policy indicates that session level restrictions must be applied to USB devices matching the system-defined device setup class, and
based on the determination, including the system-defined device setup class with the device descriptor of the USB device that is forwarded to the virtual bus driver.

20. One or more computer storage media storing computer executable instructions which when executed implement a virtual desktop infrastructure environment comprising:
an agent that executes on a server, the agent being configured to communicate with a proxy executing on a client terminal; and
a virtual bus driver that executes on the server, the virtual bus driver configured to implement USB device redirection;
wherein the agent is further configured to:
receive, from the proxy, a device descriptor of a USB device that has been connected to the client terminal;
generate, from the device descriptor, an identifier of the USB device;
search one or more INF files for the identifier;
upon determining that a particular INF file includes the identifier, obtain a system-defined device setup class that is defined in the particular INF file;
employ the system-defined device setup class to identify a policy governing redirection of USB devices matching the system-defined device setup class;
determine that the policy indicates that redirection of USB devices matching the system-defined device setup class is enabled; and based on the determination, forward the device descriptor of the USB device to the virtual bus driver to thereby cause the USB device to be enumerated on the server.

* * * * *